(12) United States Patent
Fischl et al.

(10) Patent No.: US 10,907,695 B2
(45) Date of Patent: Feb. 2, 2021

(54) BRAKE CALIPER OF A DISC BRAKE

(71) Applicant: KNORR-BREMSE Systeme fuer Nutzfahrzeuge GmbH, Munich (DE)

(72) Inventors: Tobias Fischl, Munich (DE); Wolfgang Pritz, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 16/295,639

(22) Filed: Mar. 7, 2019

(65) Prior Publication Data
US 2019/0203786 A1 Jul. 4, 2019

Related U.S. Application Data

(63) Continuation of application No. PCT/EP2017/072157, filed on Sep. 5, 2017.

(30) Foreign Application Priority Data

Sep. 8, 2016 (DE) .................. 10 2016 116 793

(51) Int. Cl.
*F16D 65/00* (2006.01)
*F16D 55/226* (2006.01)
(Continued)

(52) U.S. Cl.
CPC ....... *F16D 65/0075* (2013.01); *F16D 55/226* (2013.01); *F16D 65/183* (2013.01);
(Continued)

(58) Field of Classification Search
CPC .......... F16D 65/0075; F16D 2055/002; F16D 55/226
See application file for complete search history.

(56) References Cited

U.S. PATENT DOCUMENTS

| 3,782,508 A | 1/1974 | Cook |
| 5,433,301 A | 7/1995 | Eshghy |

(Continued)

FOREIGN PATENT DOCUMENTS

| CA | 2 849 041 A1 | 3/2013 |
| CN | 1326055 A | 12/2001 |

(Continued)

OTHER PUBLICATIONS

Chinese-language Office Action issued in counterpart Chinese Application No. 201780055491.1 dated Nov. 15, 2019 with partial English translation (nine pages).
(Continued)

*Primary Examiner* — Vishal R Sahni
(74) *Attorney, Agent, or Firm* — Crowell & Moring LLP

(57) ABSTRACT

A brake caliper of a disc brake includes tie bars which run substantially parallel and at a distance from each other and which interconnect a caliper back and a receiving area of a housing that encloses brake application functional parts. The receiving area has an approximately rectangular assembly opening closable by a closure lid. The assembly opening includes longitudinal sides extending in the direction of the tie bars and narrow sides extending transversely to the long sides. The assembly opening is adjacent to at least one flange which forms an undercut and a wall for the receiving area on one of the narrow sides.

11 Claims, 5 Drawing Sheets

(51) Int. Cl.
*F16D 65/18* (2006.01)
*F16D 55/00* (2006.01)

(52) U.S. Cl.
CPC ............... *F16D 2055/002* (2013.01); *F16D 2055/0037* (2013.01); *F16D 2200/0013* (2013.01); *F16D 2250/0084* (2013.01)

(56) References Cited

U.S. PATENT DOCUMENTS

| | | | | |
|---|---|---|---|---|
| 5,819,884 | A * | 10/1998 | Giering | F16C 19/502 |
| | | | | 188/71.9 |
| 6,955,246 | B2 * | 10/2005 | Norman | F16D 65/568 |
| | | | | 188/217 |
| 8,161,614 | B2 | 4/2012 | Plantan et al. | |
| 8,534,430 | B2 * | 9/2013 | Haertl | F16D 55/02 |
| | | | | 188/73.31 |
| 9,062,727 | B2 * | 6/2015 | Thomas | F16D 65/183 |
| 9,109,652 | B2 * | 8/2015 | Moeller | F16D 65/0043 |
| 9,568,060 | B2 * | 2/2017 | Malki | F16D 65/568 |
| 9,981,647 | B2 | 5/2018 | Welin | |
| 2002/0014376 | A1 | 2/2002 | Ortegren et al. | |
| 2005/0045434 | A1 * | 3/2005 | Holl | F16D 65/568 |
| | | | | 188/72.1 |
| 2006/0037821 | A1 | 2/2006 | Barbosa et al. | |
| 2009/0020375 | A1 | 1/2009 | Haertl et al. | |
| 2014/0202811 | A1 | 7/2014 | Gruber et al. | |
| 2016/0223037 | A1 | 8/2016 | Ebert | |
| 2017/0159732 | A1 | 6/2017 | Klingner et al. | |

FOREIGN PATENT DOCUMENTS

| | | |
|---|---|---|
| CN | 1737399 A | 2/2006 |
| CN | 101065599 A | 10/2007 |
| CN | 105612365 A | 5/2016 |
| DE | 20 2012 001 863 U1 | 5/2012 |
| DE | 11 2010 001 218 T5 | 7/2012 |
| DE | 10 2011 114 107 A1 | 3/2013 |
| DE | 10 2012 008 573 A1 | 10/2013 |
| DE | 10 2013 006 859 A1 | 10/2014 |
| DE | 10 2014 111 864 A1 | 2/2016 |
| DE | 10 2014 112 661 A1 | 3/2016 |
| DE | 10 2012 008 573 B4 | 5/2016 |
| GB | 996612 A | 6/1965 |
| WO | WO 2007/085439 A1 | 8/2007 |

OTHER PUBLICATIONS

International Search Report (PCT/ISA/210) issued in PCT Application No. PCT/EP2017/072157 dated Dec. 13, 2017 with English translation (six (6) pages).
German-language Written Opinion (PCT/ISA/237) issued in PCT Application No. PCT/EP2017/072157 dated Dec. 13, 2017 (five (5) pages).
German-language Office Action issued in counterpart German Application No. 102016116793.2 dated Jun. 13, 2017 (six (6) pages).
International Preliminary Report on Patentability (PCT/IB/326 & PCT/IB/373) issued in PCT Application No. PCT/EP2017/072157 dated Mar. 21, 2019, including English translation (Japanese-language Written Opinion (PCT/ISA/237) previously filed on Mar. 7, 2019) (seven (7) pages).

* cited by examiner

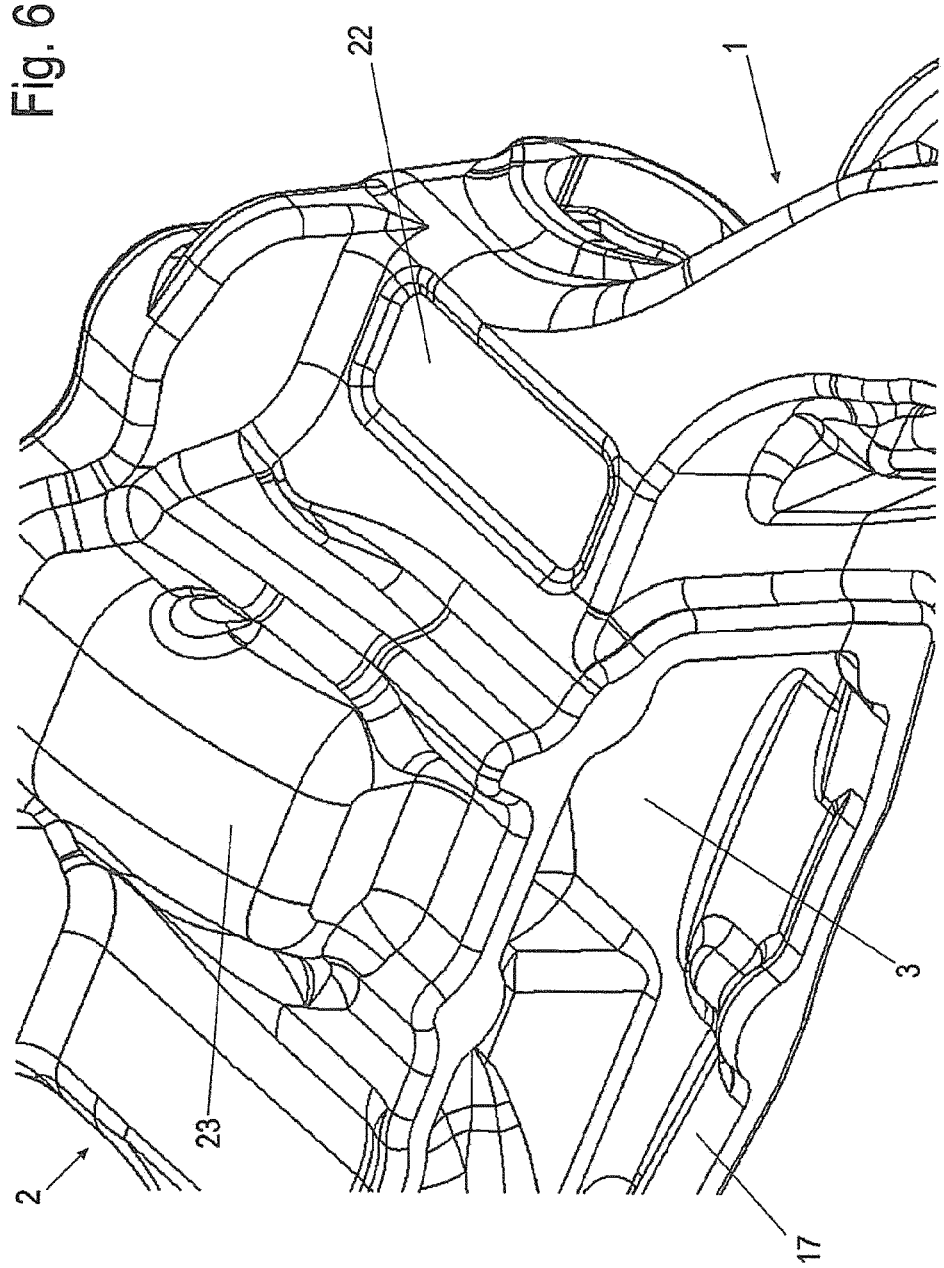

BRAKE CALIPER OF A DISC BRAKE

CROSS REFERENCE TO RELATED APPLICATIONS

This application is a continuation of PCT International Application No. PCT/EP2017/072157, filed Sep. 5, 2017, which claims priority under 35 U.S.C. § 119 from German Patent Application No. 10 2016 116 793.2, filed Sep. 8, 2016, the entire disclosures of which are herein expressly incorporated by reference.

BACKGROUND AND SUMMARY OF THE INVENTION

The invention relates to a brake caliper of a disc brake.

As a constituent part of a disc brake, in particular for a commercial vehicle, the brake caliper serves mainly to receive functional parts which are required for brake operation. These include, above all, a brake application device and an adjusting device for compensating for an air gap which changes in a wear-induced manner between brake linings and the brake disc, the brake application device and the adjusting device being inserted into a receiving space in a preassembled state as one structural unit.

Here, the receiving space which receives said functional parts is provided in a housing which is connected to a caliper back via two tie rods which are arranged in parallel and at a spacing from one another.

The brake application device has a pneumatically or electromechanically actuable brake lever which is mounted pivotably in the receiving space and by way of which a central brake plunger can be pressed against a brake application-side brake lining.

In order to assemble said functional parts, the receiving space has an assembly opening on its side which faces the tie rods, which assembly opening is closed by way of a closure cover in order to protect the functional parts after they have been assembled. Said assembly opening is of approximately rectangular configuration with two longitudinal sides which lie opposite one another and extend toward the tie rods, and two narrow sides which run transversely with respect to said longitudinal sides.

In the case of a brake caliper which is configured as a sliding caliper, the brake caliper moves in the direction of the brake disc and drives a reaction-side brake lining with it on account of the reaction forces which occur, until the two brake linings bear against the brake disc in a braking manner.

The brake caliper therefore has to have a sufficient strength, in order for it to be possible for the forces which occur to be absorbed. To this end, the known brake caliper is configured in one piece as a cast part and is of corresponding dimensions. A brake caliper of the generic type is disclosed in DE 10 2012 008 573 A1.

One substantial criterion for the long term functionality of the brake caliper is the rigidity of the overall system. Elasticities of the components which are involved, in particular of the brake disc, the brake linings and the brake caliper, result in a loss of stroke which, as a result of the transmission ratio of the brake lever, has an effect on the required stroke of a brake cylinder plunger which acts on the brake lever during a brake operation. A minimization of the elasticities, that is to say a brake system which is as rigid as possible, is therefore sought.

In the case of an action of force on supporting surfaces in the brake caliper, which surfaces, in addition to the brake lever mount, also include the brake lining bearing face, the brake caliper is as it were stretched, attempts already having been made to achieve a higher rigidity of the brake caliper by way of the material selection and shape, but without a satisfactory result up to now.

The invention is based on the object of developing a brake caliper of the generic type in such a way that the brake caliper has a higher rigidity in the case of loading.

As has been shown surprisingly, a considerable increase in the rigidity of the brake caliper is achieved by way of the assembly opening which is considerably smaller than in the prior art, the flange which is provided according to the invention forming a reinforcing bar with respect to the tie rods which are subjected, in particular, to flexural loading.

The assembly opening is preferably delimited by way of a flange on one of its narrow sides, said flange forming an undercut in the receiving space, which undercut makes it possible to assemble the brake application and adjusting devices which are present as one structural unit without problems.

To this end, said structural unit (as otherwise discussed in DE 10 2012 008 573 A1 which was cited as prior art) is first of all pivoted through the assembly opening into that region of the receiving space which is defined by way of the undercut, is subsequently pushed completely into the receiving space, and is displaced transversely with respect thereto into a final position, until there is a central arrangement of the brake plunger.

In accordance with a further concept of the invention, the threaded bores, into which screws for fastening the closure cover, by way of which the assembly opening can be closed, are screwed, are arranged exclusively in the edge regions which lie opposite one another, extend in the direction of the tie rods, and as it were form the longitudinal sides of the assembly openings, since sufficient material is available here, in order to make the threaded bores.

In accordance with a further concept of the invention, that outer edge region of the assembly opening which faces away from the receiving space is of elevated configuration in the sense of a shoulder which aids required machining for contact of the closure cover, in so far as satisfactory chip breaking which considerably facilitates the production is achieved as a result.

In addition or as an alternative, a level face is provided on the outer side, that is to say on the visible side, preferably as a depression which is also formed during casting of the brake caliper which is produced from cast iron.

Said face serves substantially for attaching signs, for example in respect of the model name or as a customer logo.

Up to now, model names and customer logos have been integrally formed during casting of the brake caliper, which is associated with considerable costs, however, in particular if customer-dependent special casting tools are required, frequently only low customer-specific quantities being produced.

In contrast, the brake caliper which is novel to this extent affords considerable cost advantages since, for example, a customer assignment can take place after production of the brake caliper by way of attaching of the corresponding sign on the level face.

Said attaching or fastening can take place in a different way. Connections by way of adhesive bonding, screw connections, riveting, stamping, clamping or the like are conceivable.

The roughness of the unfinished casting surface aids the integrally joined connection by way of adhesive bonding, which can otherwise be realized with extremely low production outlay.

In accordance with a further concept of the invention, the depression which preferably has a rectangular contour is provided on a side of the housing, which side is adjacent with respect to the dome of the brake caliper, in a region which is mechanically loaded to a low extent. In principle, however, the depression can be provided at any visible point of the brake caliper, the depth of the depression preferably being dimensioned to be so low that the plate which is to be attached therein runs flush with the adjoining surface.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 6 shows an enlarged detail of the brake caliper according to FIG. 5, likewise illustrated diagrammatically.

DETAILED DESCRIPTION OF THE DRAWINGS

Figure 1:
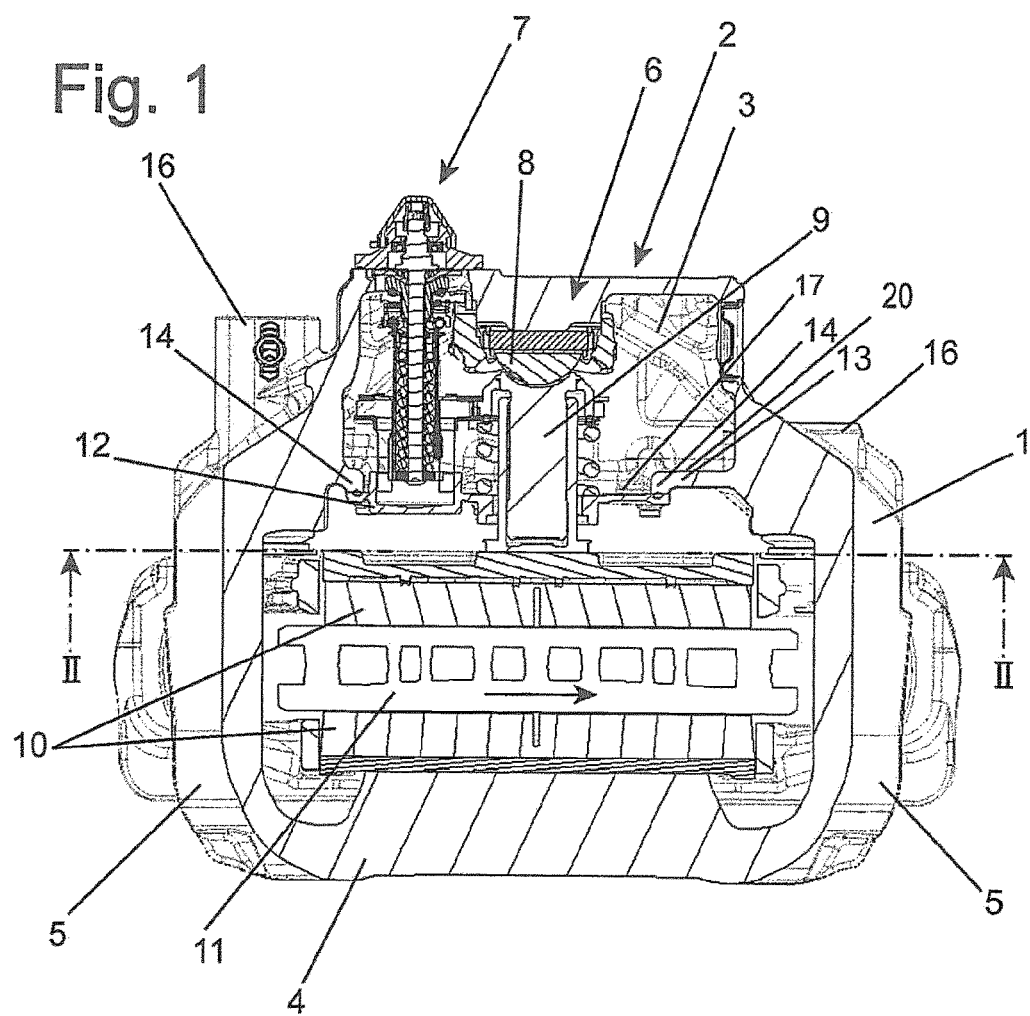
FIG. 1 shows a sectional illustration of a disc brake having a brake caliper according to an embodiment of the invention, in a plan view.
Figure 2:
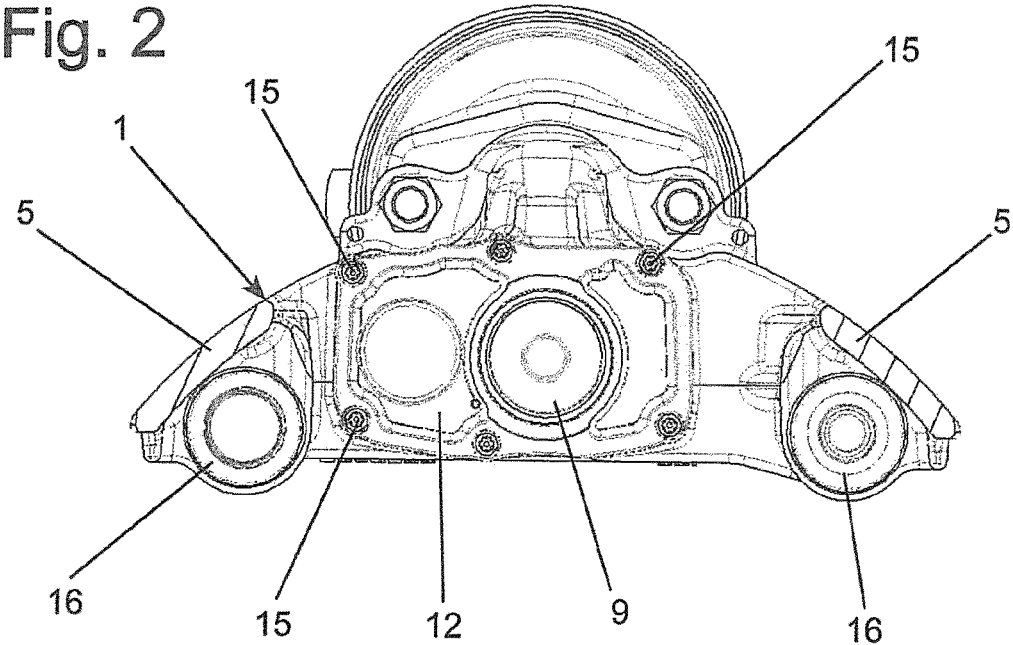
FIG. 2 shows the disc brake according to FIG. 1 in cross section according to the line II-II in FIG. 1.
Figure 3:
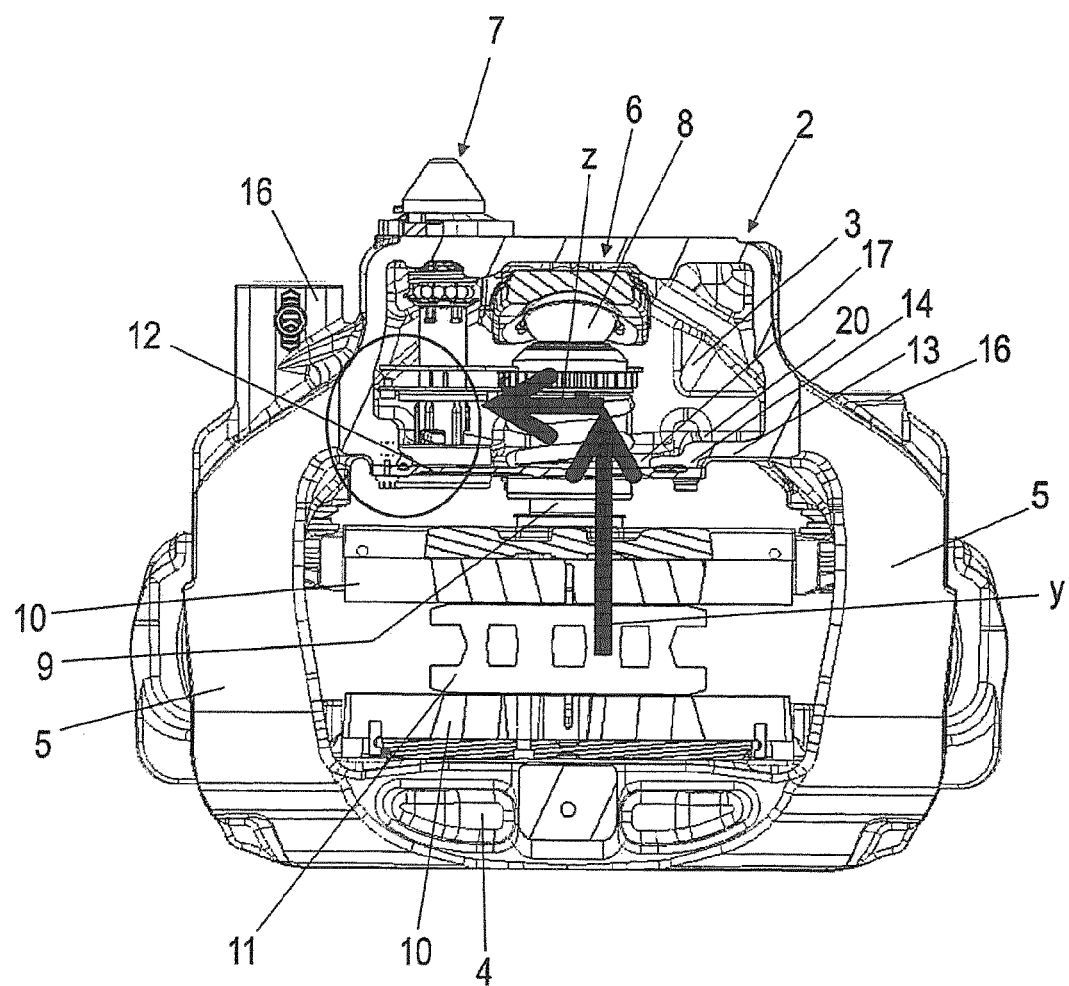
FIG. 3 shows the disc brake according to FIG. 1 in a partially sectioned plan view.

FIGS. 1-3 depict a disc brake, having a brake caliper 1 which engages over a vehicle-side brake disc 11 which rotates in the direction of the arrow during forward driving, which brake caliper 1 has a housing 2, lying opposite a caliper back 4, and two tie rods 5 which are arranged in parallel and at a spacing from one another and connect the housing 2 and the caliper back 4 to one another. The brake caliper 1 is held displaceably on a brake carrier by means of plain bearings 16.

Brake linings 10 are positioned in the brake caliper 1 on both sides of the brake disc 11, a brake plunger 9 which can be pressed by means of a pivotable brake lever 8 bearing against a brake lining 10 which is assigned to the brake application device 6.

The housing 2 encloses a receiving space 3, in which the brake application device 6 and the adjusting device 7 are arranged, it being possible for an air play which changes in a wear-induced manner, that is to say the spacing between the brake lining 10 and the brake disc 11, to be compensated for by means of the adjusting device 7.

Figure 4:
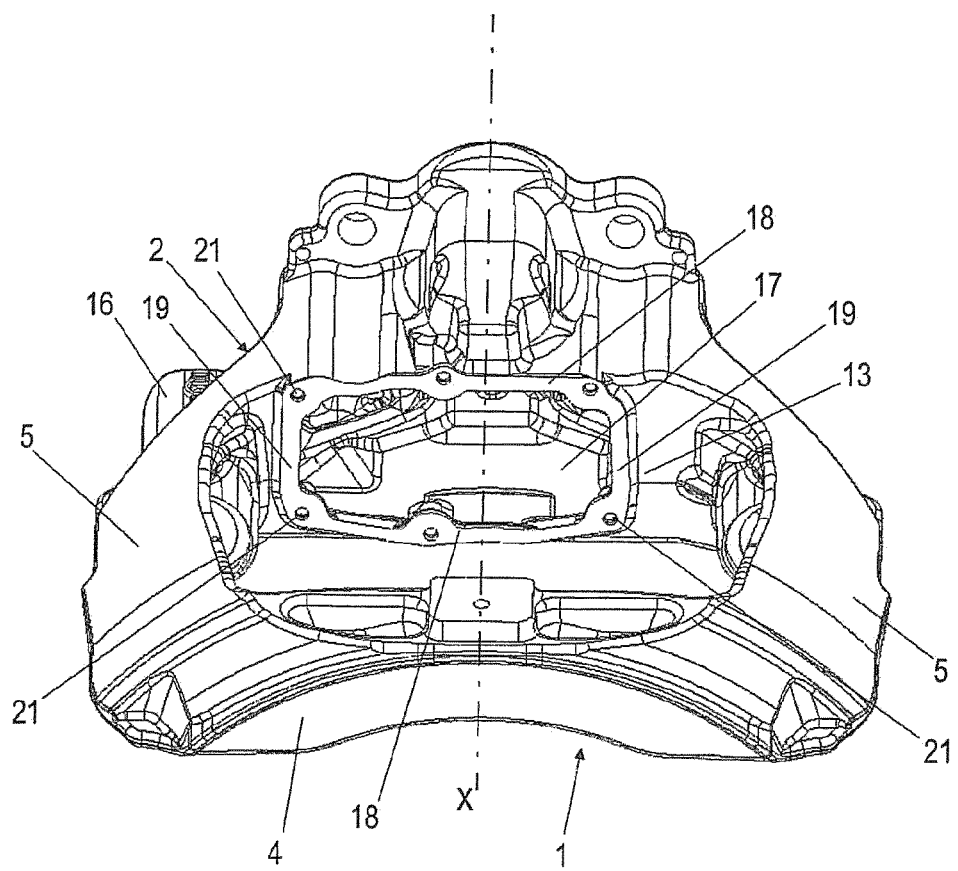
FIG. 4 shows a brake caliper of the disc brake according to FIG. 1 on its own, in a perspective plan view.

The assembly of the brake application and adjusting devices 6, 7 which are preferably present as one structural unit takes place through an approximately rectangular assembly opening 17 of the receiving space 3 which assembly opening 17 can be seen particularly clearly in FIG. 4 which illustrates the brake caliper 1 on its own and is arranged on the side facing brake application-side brake lining 10, and which is closed by way of a closure cover 12 after an assembly of the structural unit. Here, the assembly opening 17 is delimited by way of longitudinal sides 18 which extend in the direction of the tie rods 5 and narrow sides 19 which run transversely with respect to said longitudinal sides 18.

As can be seen in FIG. 1, in particular, the assembly opening 17 is delimited according to the invention by way of a flange 13 which is integrally formed on one of its narrow sides 19 and forms a wall and an undercut 20 of the receiving space 3, the web-like flange 13 extending in an imaginary continuation of the assembly opening 17 in the outlet region of the brake disc 11. This results in an asymmetrical arrangement of the assembly opening 17 in relation to the axis of symmetry X of the receiving space 3. The height of the flange 13 corresponds at least to the associated height of the assembly opening 17, whereas the thickness of the flange 13 is considerably smaller than its width.

It can be seen, furthermore, that the flange 13 is arranged on that side of the receiving space 3 which lies opposite the adjusting device 7, the flange 13 delimiting a pivoting space toward the receiving space 3 by way of the undercut 20, by way of which pivoting space the assembly of the brake application device/adjusting device 6, 7 structural unit is possible.

As indicated in FIG. 3, the initially obliquely lying structural unit is guided here into the pivoting space (arrow Y), is subsequently pivoted into a right-angled position toward the brake disc 11, and is afterward displaced out of the region of the pivoting space until the brake plunger 9 assumes a central position with respect to the associated brake lining 10 (arrow Z).

FIG. 1 shows a circumferential edge 14 of the assembly opening 17, which edge 14 is of elevated configuration on the side which faces away from the receiving space 3, and against which edge 14 the closure cover 12 bears tightly.

The latter is fastened by means of screws 15 to the brake caliper 1, threaded bores 21 which can be seen in FIG. 3 being made in the brake caliper 1, which threaded bores 21 are provided exclusively in the edge regions which lie opposite one another and form the longitudinal sides 18 of the assembly opening 17.

Figure 5:
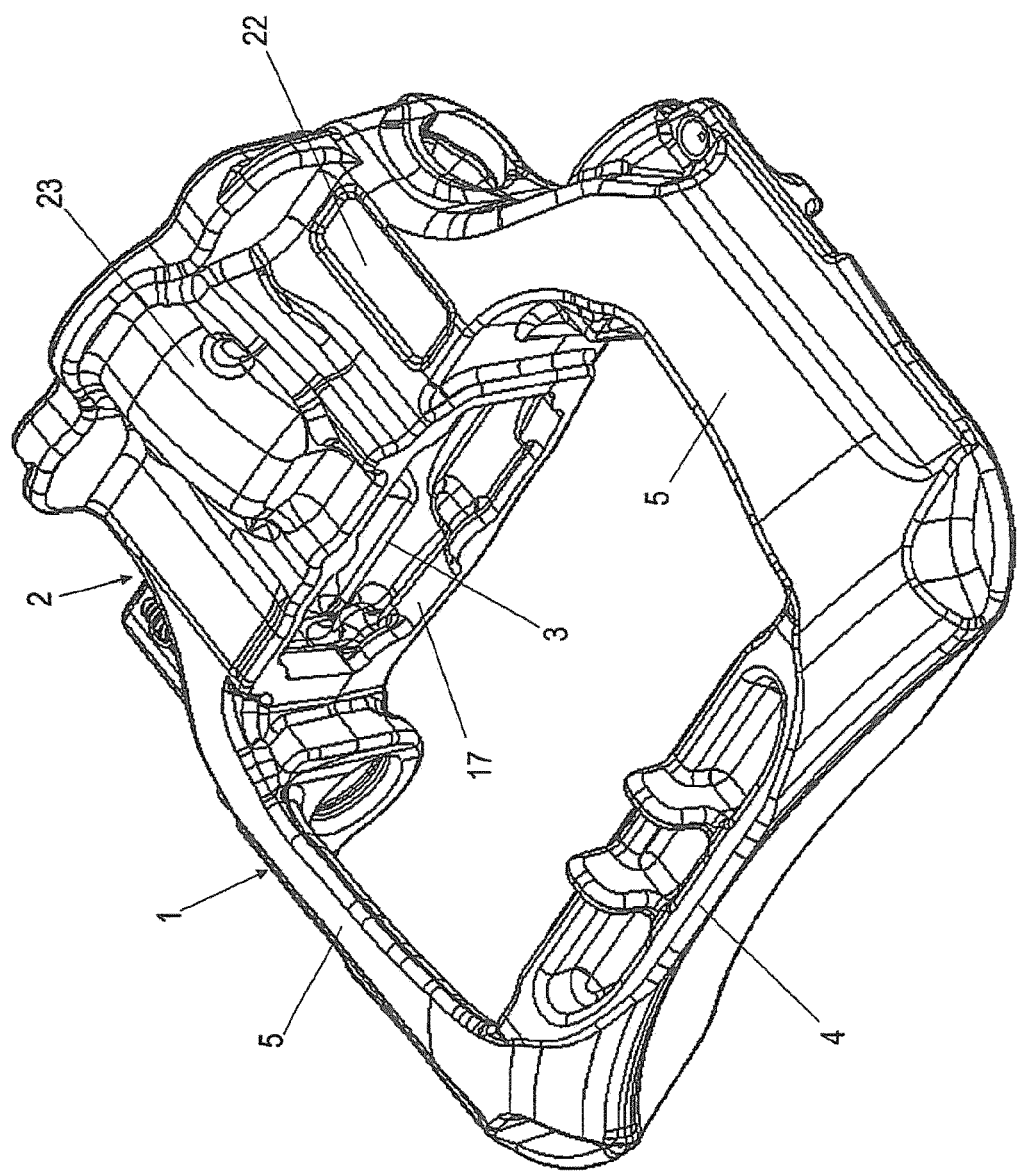
FIG. 5 shows a further embodiment of a brake caliper according to the invention, in a perspective plan view.

As can be seen clearly in FIG. 5, the receiving space 3 has an integrally formed dome 23 which receives a lever arm of the pivotable brake lever 8, on which, for example, a plunger of a brake cylinder acts.

On an adjacent side of the dome 23, a level face 22 is configured on the visible outer face of the housing 2, which level face 22 is recessed with respect to the adjoining region and thus forms a depression.

Said face 22 is configured substantially as an elongate rectangle in such a way that a likewise level sign can be fastened to it.

FIG. 6 shows the region of the housing 2 on an enlarged scale, on which region the level face 22 is configured on an adjoining side of the dome 23.

LIST OF DESIGNATIONS

1 Brake caliper
2 Housing
3 Receiving space
4 Caliper back
5 Tie rod
6 Brake application device
7 Adjusting device
8 Brake lever
9 Brake plunger
10 Brake lining
11 Brake disc 12 Closure cover
13 Flange
14 Edge
15 Screw
16 Plain bearing
17 Assembly opening
18 Longitudinal side
19 Narrow side
20 Undercut
21 Threaded bore
22 Level face
23 Dome The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake caliper of a disc brake, comprising:
   two tie rods arranged substantially in parallel and at a spacing from one another;
   a caliper back coupled to the two tie rods;
   a housing having a receiving space configured to enclose brake application parts, the receiving space having an approximately rectangular assembly opening configured to be closed by a closure cover, the rectangular assembly opening having longitudinal sides which extend in the direction of the tie rods and narrow sides which extend transversely with respect to the longitudinal sides,
   wherein
      a center of the receiving space is equidistant between the two tie rods in a circumferential direction of the disk brake,
      when the brake application parts are in an installed position in the housing a center of the brake application parts is equidistant between the two tie rods in the circumferential direction of the disk brake,
      the assembly opening is arranged asymmetrically relative to center of the receiving space in the circumferential direction of the disk brake,
      the asymmetric assembly opening is delimited by at least one flange on one of the narrow sides, the at least one flange being located between the assembly opening and one of the two tie rods in the circumferential direction of the disk brake and defining, an undercut and a wall of the receiving space, and
      the flange delimits a pivoting space into which at least a portion of the brake application parts are received when the brake application parts are inserted through the assembly opening and pivoted into an operating position in the receiving space.

2. The brake caliper as claimed in claim 1, wherein
the flange is arranged on a side of the receiving space which lies opposite a location of an brake adjusting device.

3. The brake caliper as claimed in claim 2, wherein
an outer circumferential edge of the assembly opening adjacent to the flange is formed as an elevated projection facing away from the receiving space.

4. The brake caliper as claimed in claim 3, wherein
the flange extends over an entire height of the adjacent one of the narrow sides of the assembly opening.

5. The brake caliper as claimed in claim 1, wherein
the flange is arranged on an outlet side of the brake caliper.

6. The brake caliper as claimed in claim 5, wherein
threaded bores are provided exclusively on the longitudinal edges of the assembly opening.

7. The brake caliper as claimed in claim 6, wherein
a thickness of the flange is smaller than a width of the flange between the assembly opening and the one of the two tie rods.

8. The brake caliper as claimed in claim 1, wherein
a level face is configured in a part region of an externally-visible outer face of the brake caliper.

9. The brake caliper as claimed in claim 8, wherein
the level face is arranged on an adjoining side of a dome configured to receive a lever arm of a pivotable brake lever, the dome being integrally formed with the housing.

10. The brake caliper as claimed in claim 9, wherein
the level face is a rectangle.

11. The brake caliper as claimed in claim 10, wherein
the level face is lowered with respect to an adjoining region of the brake caliper.

* * * * *